(12) United States Patent
Moriya et al.

(10) Patent No.: US 9,545,900 B2
(45) Date of Patent: Jan. 17, 2017

(54) CONTROL DEVICE AND CONTROL METHOD FOR VEHICLE

(71) Applicants: Kouki Moriya, Aichi-gun (JP); Yutaka Fukatsu, Toyota (JP)

(72) Inventors: Kouki Moriya, Aichi-gun (JP); Yutaka Fukatsu, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/345,827

(22) PCT Filed: Sep. 19, 2012

(86) PCT No.: PCT/IB2012/001827
§ 371 (c)(1),
(2) Date: Mar. 19, 2014

(87) PCT Pub. No.: WO2013/041943
PCT Pub. Date: Mar. 28, 2013

(65) Prior Publication Data
US 2014/0229085 A1    Aug. 14, 2014

(30) Foreign Application Priority Data
Sep. 20, 2011  (JP) ................... 2011-205045

(51) Int. Cl.
*B60T 7/12* (2006.01)
*B60W 10/06* (2006.01)
*B60W 30/18* (2012.01)
*B60W 10/184* (2012.01)

(52) U.S. Cl.
CPC ............. *B60T 7/122* (2013.01); *B60W 10/06* (2013.01); *B60W 10/184* (2013.01); *B60W 30/18018* (2013.01); *B60W 30/18063* (2013.01); *B60W 30/18118* (2013.01); *B60W 2510/0638* (2013.01)

(58) Field of Classification Search
CPC ............ B60W 30/18118; B60W 10/06; B60W 30/18018; B60T 7/122
See application file for complete search history.

(56) References Cited

U.S. PATENT DOCUMENTS

| | | | |
|---|---|---|---|
| 6,135,920 A | 10/2000 | Kamiya et al. | |
| 2002/0086772 A1 | 7/2002 | Abe et al. | |
| 2005/0125133 A1* | 6/2005 | Yamada ............... | B60T 8/4872 701/70 |
| 2007/0054773 A1 | 3/2007 | Braun et al. | |
| 2011/0136625 A1* | 6/2011 | Yu et al. ....................... | 477/185 |

(Continued)

FOREIGN PATENT DOCUMENTS

| | | |
|---|---|---|
| CN | 101790478 A | 7/2010 |
| CN | 102092386 A | 6/2011 |

(Continued)

*Primary Examiner* — Basil T Jos
(74) *Attorney, Agent, or Firm* — Oliff PLC

(57) ABSTRACT

Hill hold control for a vehicle that is executed in response to idling stop of an engine is cancelled on the condition that a command to restart the engine for recovery from the idling stop is issued and an engine rotation speed is higher than or equal to a predetermined determination value; whereas, cancellation of the hill hold control is prohibited when the engine is in process of being stopped through the idling stop.

14 Claims, 8 Drawing Sheets

(56) References Cited

U.S. PATENT DOCUMENTS

2011/0202245 A1     8/2011  Cayol et al.
2013/0116087 A1*    5/2013  Ichikawa ................ B60K 5/08
                                                            477/79

FOREIGN PATENT DOCUMENTS

| DE | 103 17 501 A1 | 11/2004 |
| EP | 0 950 557 A2 | 10/1999 |
| EP | 0 950 557 B1 | 9/2004 |
| JP | A-2000-313253 | 11/2000 |
| JP | 2002-193082 A | 7/2002 |
| JP | 2002-283980 A | 10/2002 |
| JP | A-2005-248967 | 9/2005 |
| JP | 2011-099324 A | 5/2011 |

* cited by examiner

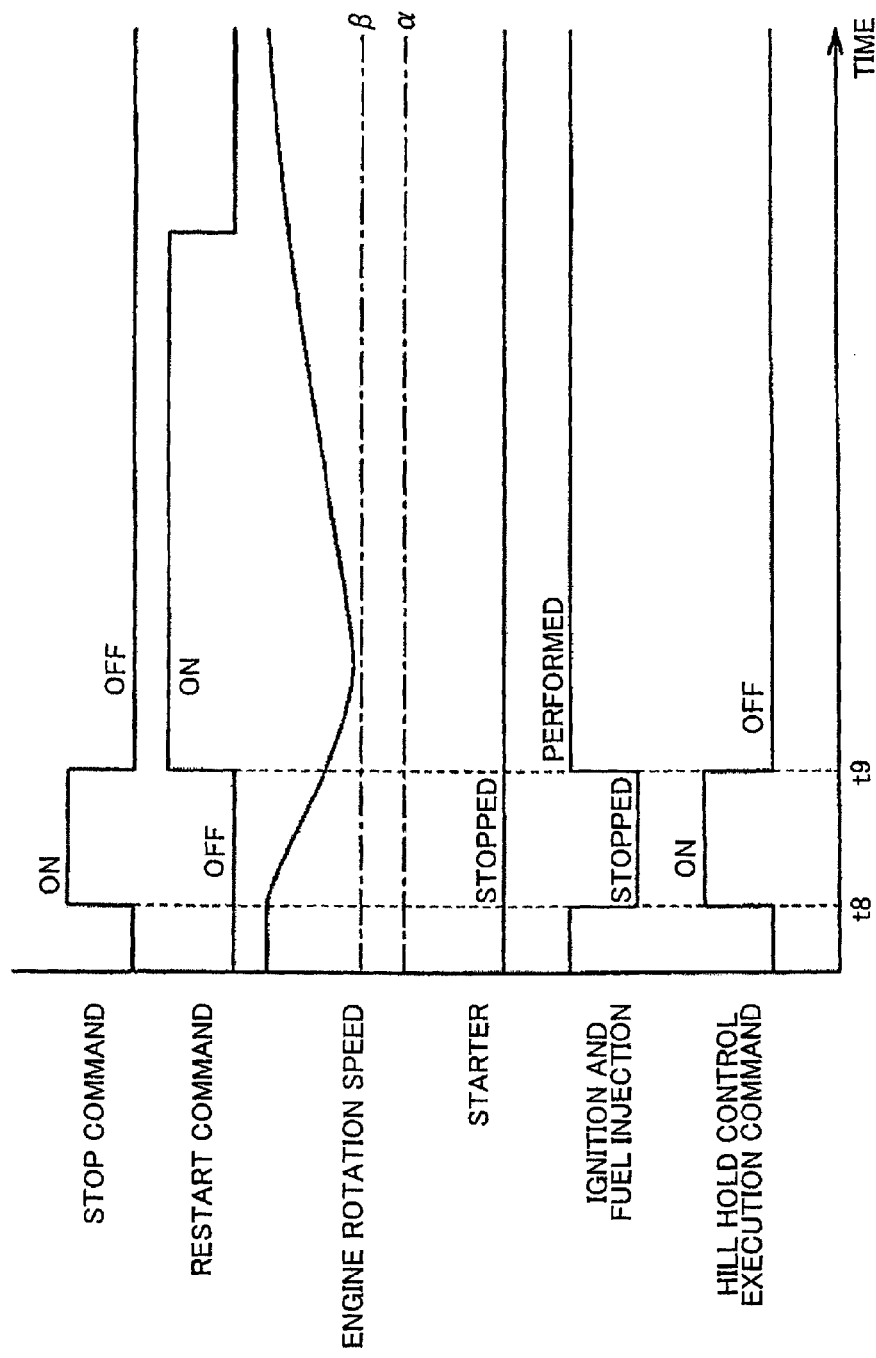

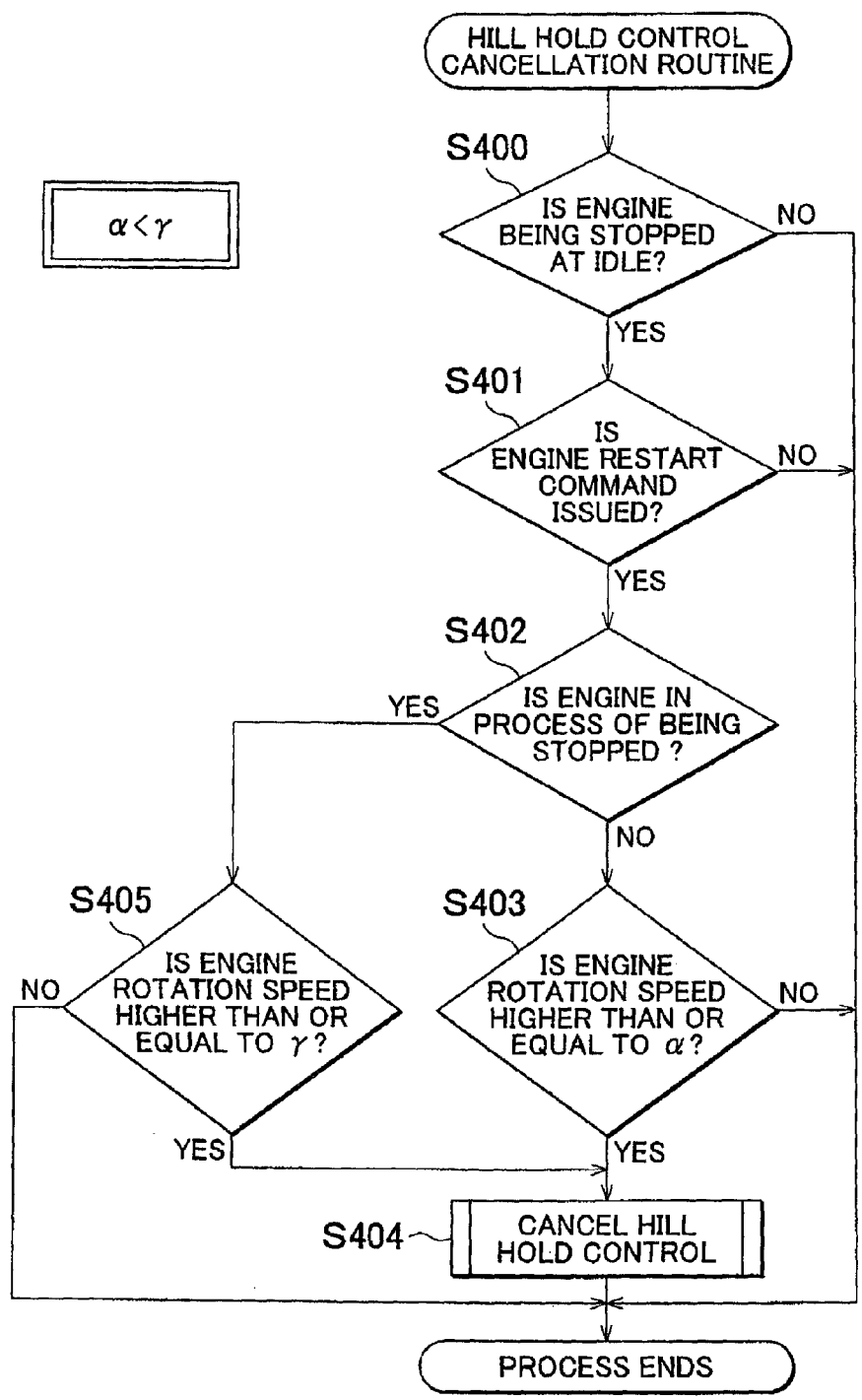

CONTROL DEVICE AND CONTROL METHOD FOR VEHICLE

BACKGROUND OF THE INVENTION

1. Field of the Invention

The invention relates to a control device and control method for a vehicle, which execute hill hold control for applying braking force to wheels independent of driver's brake operation in response to an idling stop of an engine.

2. Description of Related Art

In a vehicle that is configured to couple an engine to a transmission via a fluid coupling, such as a torque converter, a set torque is applied to wheels due to creep torque even during idling of the engine. Therefore, in such a vehicle, even when a brake pedal is not depressed, it is possible to hold the vehicle in a stopped state on a hill by torque transmitted to wheels, that is, so-called creep torque, so a hill start of the vehicle is easy.

On the other hand, in recent years, for the purpose of improvement in fuel economy, there has been practically used a vehicle that performs idling stop in which engine operation is automatically stopped during a stop of the vehicle. In such a vehicle, when idling stop is performed during a stop of the vehicle on a hill, creep torque is not generated, and wheels are not braked during a pedal change operation from a brake pedal to an accelerator pedal, so the hill start performance of the vehicle deteriorates.

Then, in an existing art, Japanese Patent Application Publication No. 2000-313253 (JP 2000-313253 A) describes a control device for a vehicle. The control device executes hill hold control for applying braking force to wheels independent of driver's brake operation in response to an idling stop of an engine. By so doing, even when a brake pedal is released during a stop of the engine resulting from idling stop while the vehicle is stopped on a hill, the vehicle is maintained in a stopped state to allow easy hill start. Note that, in the control device for a vehicle, described in JP 2000-313253 A, hill hold control is cancelled on the condition that, after a command to restart the engine through cancellation of idling stop, an engine rotation speed is higher than or equal to a rotation speed at which it is possible to generate sufficient creep torque.

Incidentally, depending on circumstances, in process of stopping the engine through idling stop, that is, during coasting of the engine after operation of the engine is stopped, a command to restart the engine may be issued in response to driver's accelerator operation, or the like. In such a case as well, with the above described control device for a vehicle, when the engine rotation speed at the time of issuance of a restart command is sufficiently high, hill hold control is cancelled at that point in time. However, the engine rotation speed, at which it is possible to restart the engine with the use of a starter, has an upper limit, and a restart of the engine by driving the starter in response to a restart command cannot be performed until the engine rotation speed is sufficiently low. Therefore, in the above described case, the engine rotation speed decreases after cancellation of hill hold control and then sufficient creep torque may not be transmitted to the wheels. Then, in such a case, the wheels cannot be braked during a change operation from the brake pedal to the accelerator pedal, so the hill start performance of the vehicle deteriorates.

In addition, in process of stopping the engine through idling stop, a restart of the engine may not be initiated immediately after issuance of a restart command, so there occurs a delay from depression of the accelerator pedal to generation of propelling force of the vehicle. Therefore, when hill hold control is cancelled in process of stopping the engine through idling stop, even when a change operation from the brake pedal to the accelerator pedal is quickly performed, the vehicle cannot temporarily be held in a stopped state, so the hill start performance of the vehicle may deteriorate.

SUMMARY OF THE INVENTION

The invention provides a control device and control method for a vehicle, which are able to further suitably ensure the hill start performance of the vehicle that performs idling stop of an engine.

A first aspect of the invention provides a control device for a vehicle, which executes hill hold control for applying braking force to a wheel independent of driver's brake operation in response to idling stop of an engine. The control device includes a control unit configured to prohibit cancellation of the hill hold control when the engine is in process of being, stopped through the idling stop.

With the above configuration, even when a command to restart the engine is issued while hill hold control is being executed during the idling stop, when the engine is in process of being stopped through the idling stop, cancellation of the hill hold control is prohibited. Therefore, even when brake operation is released in a period from issuance of a restart command to when the engine is actually restarted, braking force applied to the wheel is held by continuing the hill hold control. Thus, with the above configuration, it is possible to further suitably ensure the hill start performance of the vehicle that performs the idling stop of the engine.

Note that, even when the engine is in process of being stopped through the idling stop, when an engine rotation speed is higher than or equal to a certain level, it is possible to autonomously recover engine operation, that is, to autonomously resume the engine operation without using a starter. Therefore, in this case, even when a restart command is issued in process of stopping the engine, through the idling stop, it is possible to resume the engine operation before the engine rotation speed significantly decreases. Then, in the control device according to the first aspect, the control unit may be configured to, autonomously recover engine operation and cancel the hill hold control when the engine is in process of being stopped through the idling stop and the engine operation is autonomously recoverable. In this case, even when the engine is in process of being stopped, it is possible to quickly resume the engine operation, so it is possible to avoid deterioration of the hill start performance of the vehicle due to shortage of braking force supplied to the wheel as a result of cancellation of the hill hold control.

A second aspect of the invention provides a control device for a vehicle, which executes hill hold control for applying braking force to a wheel independent of driver's brake operation in response to idling stop of an engine. The control device includes a control unit configured to cancel the hill hold control on the condition that a command to restart the engine is issued after issuance of a command to stop engine operation through the idling stop; an engine rotation speed is higher than or equal to a predetermined determination value and the engine rotation speed is increasing.

With the above configuration, because the fact that the engine rotation speed is increasing is one of the conditions for cancelling the hill hold control, the hill hold control is not cancelled when the engine rotation speed is decreasing in process of stopping the engine through the idling stop. Thus, with the above configuration, it is possible to further suitably ensure the hill start performance of the vehicle that performs the idling stop of the engine.

Note that, as described above, even when the engine is in process of being stopped through the idling stop, when engine operation is autonomously recoverable, it is possible to quickly resume the engine operation after issuance of a restart command. Therefore, in the control device according to the second embodiment, the control unit may be configured to autonomously recover the engine operation and cancel the hill hold control when the engine rotation speed is not increasing and the engine operation is autonomously recoverable. By so doing as well, it is possible to suitably ensure the hill start performance of the vehicle.

A third aspect of the invention provides, a control device for a vehicle, which executes hill hold control for applying braking force to a wheel independent of driver's brake operation in response to idling stop of an engine. The control device includes a control unit configured to cancel the hill hold control on the condition that a command to restart the engine is issued after issuance of a command to stop engine operation through the idling stop, an engine rotation speed is higher than or equal to a predetermined determination value and there is a history that a starter is driven in response to the restart command.

With the above configuration, because the fact that there is a history that the starter is driven in response to a restart command is one of the conditions for cancelling the hill hold control, the hill hold control is cancelled after a restart of the engine is initiated. Therefore, when the engine is in process of being stopped through the idling stop, the hill hold control is not cancelled, so it is possible to further suitably ensure the hill start performance of the vehicle that performs the idling stop of the engine.

Note that, as described above, even when the engine is in process of being stopped through the idling stop, when engine operation is autonomously recoverable, it is possible to quickly resume the engine operation after issuance of a restart command. Therefore, in the control device according to the third embodiment, the control unit may be configured to autonomously recover the engine operation and cancel the hill hold control when the engine operation is autonomously recoverable, and there is no history that the starter is driven. By so doing as well, it is possible to suitably ensure the hill start performance of the vehicle.

A fourth aspect of the invention provides a control device for a vehicle, which executes hill hold control for applying braking force to a wheel independent of driver's brake operation in response to idling stop of an engine. The control device includes a control unit configured to change a condition for cancelling the hill hold control between when the engine is in process of being stopped through the idling stop and when the engine is not in process of being stopped through the idling stop.

With the above configuration, the hill hold control is cancelled on the basis of different conditions between when the engine is in process of being stopped through the idling stop and when the engine is not in process of being stopped through the idling stop. In such a case, it is possible to make it hard for the hill hold control to be cancelled when the engine is in process of being stopped than when the engine is not in process of being stopped. In this case, it is possible to suppress deterioration of the hill start performance of the vehicle due to cancellation of the hill hold control in process of stopping the engine. As for an example mode for changing the cancelling condition, for example, in the control device according to the fourth aspect, the control unit may be configured to cancel the hill hold control on the condition that an engine rotation speed is higher than or equal to a predetermined determination value and to set the predetermined determination value to a larger value when the engine is in process of being stopped through the idling stop than when the engine is not in process of being stopped through the idling stop.

A fifth aspect of the invention provides a control method for a vehicle. The control method includes: executing hill hold control for applying braking force to a wheel independent of driver's brake operation in response to idling stop of an engine; and prohibiting cancellation of the hill hold control when the engine is in process of being stopped through the idling stop.

A sixth aspect of the invention provides a control method for a vehicle. The control method includes: executing hill hold control for applying braking force to a wheel independent of driver's brake operation in response to idling stop of an engine; and cancelling the hill hold control on the condition that a command to restart the engine is issued after issuance of a command to stop engine operation through the idling stop, an engine rotation speed is higher than or equal to a predetermined determination value and the engine rotation speed is increasing.

A seventh aspect of the invention provides a control method for a vehicle. The control method includes: executing hill hold control for applying braking force to a wheel independent of driver's brake operation in response to idling stop of an engine; and cancelling the hill hold control on the condition that a command to restart the engine is issued after issuance of a command to stop engine operation through the idling stop, an engine rotation speed is higher than or equal to a predetermined determination value and there is a history that a starter is driven in response to the restart command.

An eighth aspect of the invention provides a control method for a vehicle. The control method includes: executing hill hold control for applying braking force to a wheel independent of driver's brake operation in response to idling stop of an engine; and changing a condition for cancelling the hill hold control between when the engine is in process of being stopped through the idling stop and when the engine is not in process of being stopped through the idling stop.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 7 is a time chart that shows an example of a control mode according to the third embodiment; and FIG. 8 is a flowchart that shows the procedure of a hill hold control cancellation routine employed in a fourth embodiment of the invention.

DETAILED DESCRIPTION OF EMBODIMENTS

First Embodiment

Figure 1:
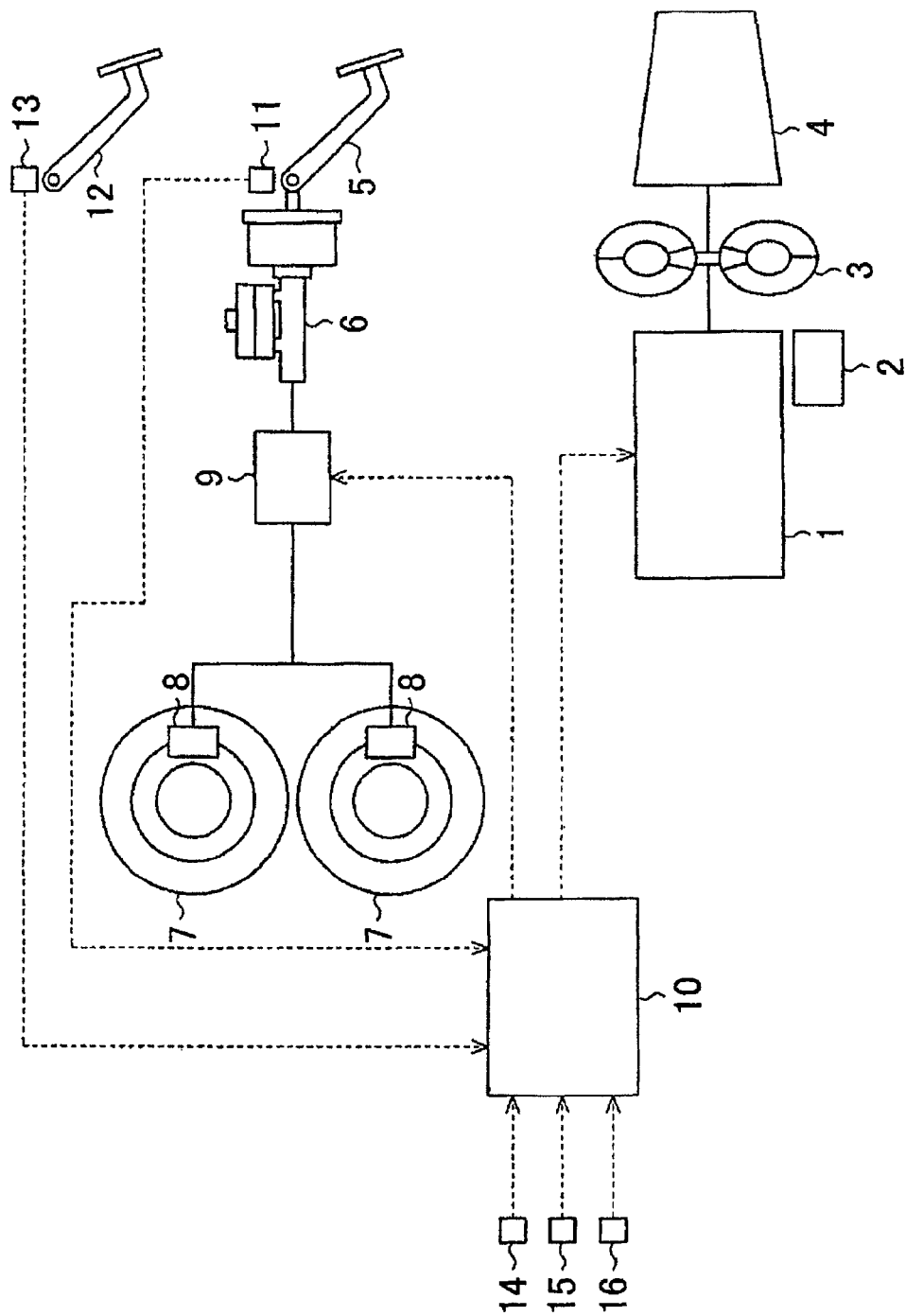
FIG. 1 is a schematic view that schematically shows the configuration of a first embodiment of the invention.
Figure 2:
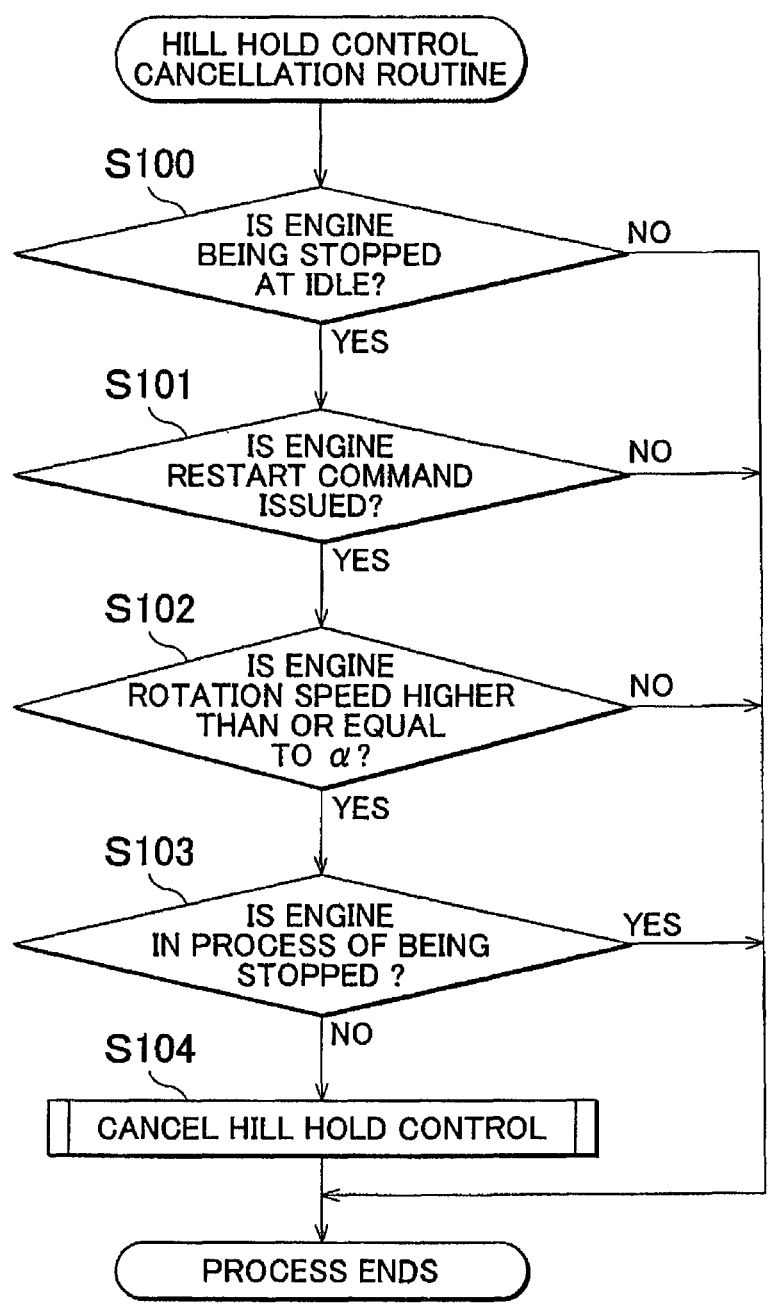
FIG. 2 is a flowchart that shows the procedure of a hill hold control cancellation routine employed in the first embodiment.
Figure 3:
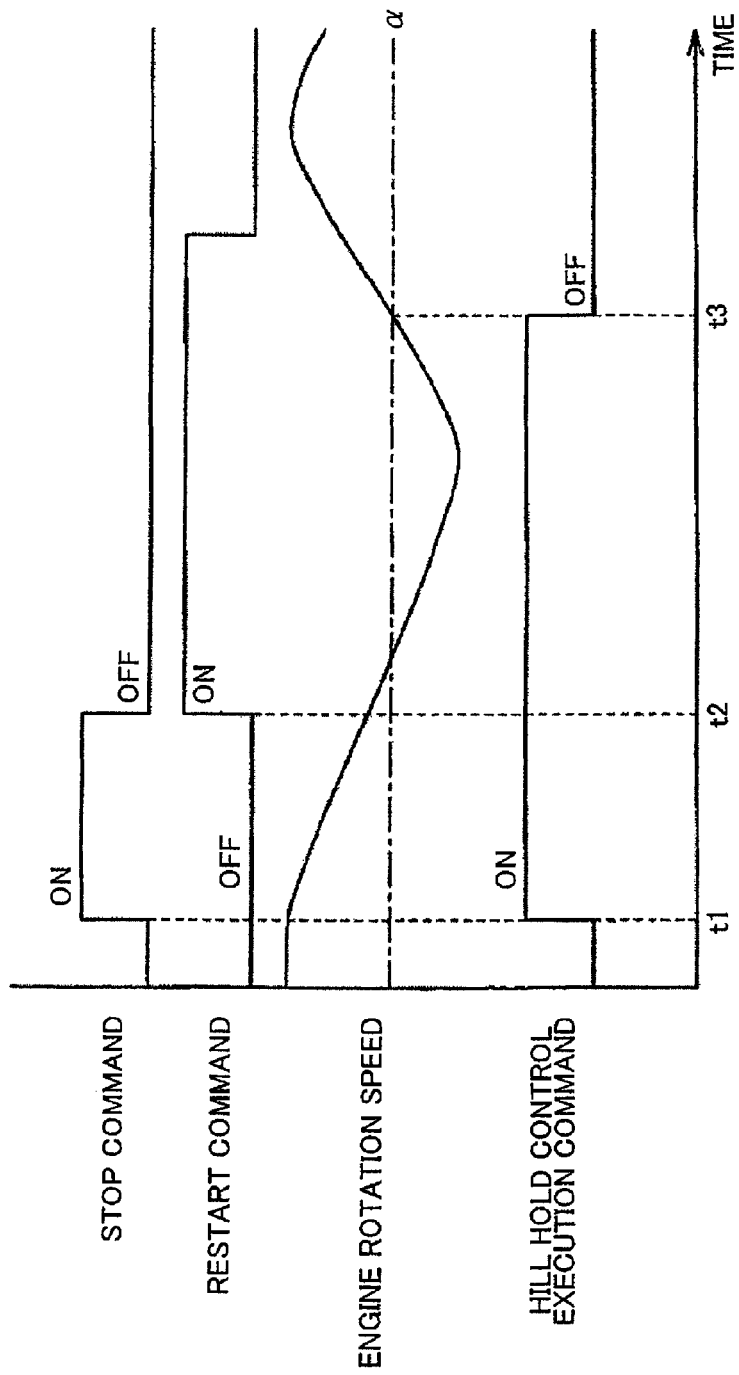
FIG. 3 is a time chart that shows an example of a control mode according to the first embodiment.

Hereinafter, a first example embodiment of the control device for a vehicle according to the aspect of the invention will be described in detail with reference to FIG. 1 to FIG. 3.

First, the configuration of the control device for a vehicle according to the present embodiment will be described with reference to FIG. 1. For an engine 1 of the vehicle to which the control device according to the present embodiment is applied, a starter 2 that electrically rotates a crankshaft to start the engine 1 is provided as an auxiliary machine. The engine 1 is drivably coupled to an automatic transmission 4 via a torque converter 3. The torque converter 3 serves as a fluid coupling having a torque amplifying function. Note that, in the thus configured vehicle, the torque converter 3 is not able to completely interrupt power transmission, so, even during idling of the engine 1, a set torque, that is, so-called creep torque, is transmitted to a side adjacent to the automatic transmission 4 and, by extension, drive wheels.

On the other hand, a brake system of the vehicle includes a master cylinder 6 that generates brake hydraulic pressure in response to depression of a brake pedal 5. In addition, the brake system of the vehicle includes a brake actuator 9 that adjusts brake hydraulic pressure supplied to brakes 8 of respective wheels 7.

The thus configured vehicle is controlled by an electronic control unit 10. The electronic control unit 10 is configured as a computer device that includes a central processing unit (CPU), a read only memory (ROM) and a random access memory (RAM). The CPU executes various computation processes associated with vehicle control. The ROM stores programs and data for vehicle control. The RAM temporarily stores computation results of the CPU, results detected by sensors, and the like. Signals are input from a brake pedal sensor 11 and an accelerator pedal sensor 13 to the electronic control unit 10. The brake pedal sensor 11 outputs a brake signal corresponding to driver's brake operation, that is, depression of the brake pedal 5. The accelerator pedal sensor 13 outputs an accelerator signal corresponding to depression of an accelerator pedal 12. In addition, signals are also input from an acceleration sensor 14, wheel speed sensors 15, a crank angle sensor 16, and the like, to the electronic control unit 10. The acceleration sensor 14 outputs an acceleration signal corresponding to an acceleration of the vehicle. The wheel speed sensors 15 respectively output wheel speed signals corresponding to rotation speeds (wheel speeds) of the corresponding wheels 7. The crank angle sensor 16 outputs a crank angle signal corresponding to a crank angle of the engine 1. Note that the electronic control unit 10 is configured to determine the gradient of a road surface on which the vehicle is located from the acceleration signal output from the acceleration sensor 14, and to determine an engine rotation speed from the crank angle signal output from the crank angle sensor 16.

In the thus configured control device for a vehicle according to the present embodiment, the electronic control unit 10 executes idling stop control over engine operation as part of vehicle control. In the idling stop control, when the electronic control unit 10 has detected that the vehicle has been stopped for a set period of time or longer, the electronic control unit 10 outputs a stop command to the engine 1 to stop fuel supply and ignition of the engine 1 to thereby automatically stop the engine operation. In addition, after such an automatic stop of the engine operation, when the electronic control unit 10 has detected a start operation through depression of the accelerator pedal 12, or the like, the electronic control unit 10 outputs a restart command to the engine 1 to restart fuel supply and ignition to thereby restart the engine 1. Note that there is an upper limit of the engine rotation speed at which the starter 2 is able to restart the engine 1. Therefore, when the engine rotation speed at the time of issuance of a restart command is higher than a certain level, an actual restart of the engine 1 is performed after the engine rotation speed decreases to a set value (hereinafter, referred to as "cranking rotation speed") or below.

Furthermore, the electronic control unit 10 executes hill hold control in which braking force is applied to the wheels 7 in response to the above idling stop of the engine 1 independent of driver's brake operation. In the hill hold control, the brake actuator 9 is controlled such that a brake hydraulic pressure supplied to the brake 8 of each of the wheels 7 is held at or above a set value when it has been detected that the vehicle is stopped on a hill and the engine 1 is being stopped at an idle.

On the other hand, the electronic control unit 10 cancels the above hill hold control resulting from the idling stop of the engine 1 basically on the condition that a command to restart the engine 1 for recovery from the idling stop is issued and the engine rotation speed is higher than or equal to a predetermined determination value α. Note that the determination value α is set to an engine rotation speed at which it is possible to obtain creep torque that ensures sufficient hill start performance. In addition the determination value α is higher than the cranking rotation speed. That is, in the present embodiment, after issuance of a restart command, when the engine rotation speed is a value at which it is possible to obtain creep torque ensures sufficient hill start performance, it is determined that, even when hill hold control is cancelled, the hill start performance of the vehicle is ensured by creep torque and then hill hold control is cancelled.

However, the control device for a vehicle according to the present embodiment is configured such that, in process of stopping the engine 1 through idling stop, that is, while the engine 1 is coasting after a stop of fuel supply and ignition in response to a stop command, cancellation of hill hold control is prohibited even when the engine rotation speed is higher than or equal to the determination value α after issuance of a restart command. Cancellation of hill hold control in the control device for a vehicle according to the present embodiment is performed through the process of a hill hold control cancellation routine shown in FIG. 2. The process of the routine is repeatedly executed at predetermined control intervals by the electronic control unit 10 during hill hold control.

When the process of the routine is started, initially, it is determined in step S100 whether the engine 1 is being stopped at an idle, that is, whether active hill hold control is caused by idling stop. Here, when the engine 1 is not being stopped at an idle (NO in S100), the current process of the routine directly ends. On the other hand, when the engine 1 is being stopped at an idle (YES in S100), the process proceeds to step S101.

When the process proceeds to step S101, it is determined in step S101 whether a command to restart the engine 1 is issued. Here, when a restart command is not issued (NO in S101), the current process of the routine directly ends. On the other hand, when a restart command is issued (YES in S101), the process proceeds to step S102.

When the process proceeds to step S102, it is determined in step S102 whether the engine rotation speed is higher than or equal to the determination value α. Here, when the engine rotation speed is lower than the determination value α (NO in S102), the current process of the routine directly ends. On the other hand, when the engine rotation speed is higher than or equal to the determination value α (YES in S102), the process proceeds to step S103.

When the process proceeds to step S103, it is determined in step S103 whether the engine 1 is in process of being stopped through idling stop, that is, whether the engine 1 is coasting after operation of the engine 1 is stopped. Note that the fact that the engine 1 is in process of being stopped may be determined on the basis of the fact that there is no history that the starter 2 is driven in response to a restart command, the fact that the engine rotation speed is not increasing or the engine rotation speed is decreasing, or the like.

Here, when the engine 1 is in process of being stopped (YES in S103), the current process of the routine directly ends. That is, in the routine, even when the engine rotation speed is higher than or equal to the determination value α after issuance of a restart command, when the engine 1 is in process of being stopped through idling stop, cancellation of hill hold control is prohibited. On the other hand, when the engine 1 is not in process of being stopped (NO in S103), a command to cancel hill hold control is issued in step S104, and then the current process of the routine ends.

Next, the operation of the present embodiment will be described with reference to FIG. 3. FIG. 3 shows an example of a control mode of the control device for a vehicle according to the present embodiment when the vehicle is stopped on a hill. In a control example of the drawing, at time t1, a command to stop engine operation through idling stop is issued and, at the same time, a command to execute hill hold control is issued to start hill hold control. After that, at time t2, a restart command to resume engine operation stopped through idling stop is issued.

However, in the control example of the drawing, the restart command is issued before the engine 1 completely stops in response to the stop command at time t1. In addition, the engine rotation speed at that point in time is higher than or equal to the determination value α. Therefore, in the existing control device for a vehicle, which cancels hill hold control on the condition that the engine rotation speed is higher than or equal to a set value after issuance of a restart command, hill hold control is cancelled at time t2. At this point in time, the engine 1 is in process of being stopped, and the engine 1 is not restarted by the starter 2 until the engine rotation speed decreases to the above described cranking rotation speed or below. Therefore, after issuance of the restart command, the engine rotation speed decreases for a while. When hill hold control is cancelled in such a state, creep torque transmitted to the drive wheels decreases with a decrease in the engine rotation speed. Therefore, sufficient braking force cannot be applied to the wheels 7 when the brake pedal 5 is released, and the hill start performance of the vehicle deteriorates.

In contrast to this, the control device for a vehicle according to the present embodiment is configured such that, even when the engine rotation speed is higher than or equal to the determination value α after issuance of the restart command, when the engine 1 is in process of being stopped through idling stop, cancellation of hill hold, control is prohibited. Therefore, in the present embodiment, cancellation of hill hold control is performed not at time t2 but at time t3 at which the engine rotation speed is recovered to the determination value α or above with an increase in the engine rotation speed after the engine 1 is restarted by the starter 2. Thus, in the present embodiment, even when a restart command is issued in process of stopping the engine 1 through idling stop, deterioration of the hill start performance of the vehicle due to a decrease in the engine rotation speed after cancellation of hill hold control is avoided.

With the above described control device for a vehicle according to the present embodiment, the following advantageous effects are obtained.

(1) In the present embodiment, the electronic control unit 10 prohibits cancellation of hill hold control when the engine 1 is in process of being stopped through idling stop. Therefore, deterioration of the hill start performance of the vehicle due to a decrease in the engine rotation speed after cancellation of hill hold control is avoided to thereby make it possible to further suitably ensure the hill hold performance of the vehicle that performs idling stop of the engine 1.

Second Embodiment

Next, a second example embodiment of the control device for a vehicle according to the aspect of the invention will be described in detail with reference to FIG. 4 and FIG. 5. Note that, in the present embodiment and the following embodiments, like reference numerals denote similar components to those of the above described embodiment and the detailed description thereof is omitted.

In the control device for a vehicle according to the present embodiment, cancellation of hill hold control executed in response to idling stop of the engine 1 is performed on the condition that all the following conditions (a) to (c) are satisfied after issuance of a command to stop engine operation through idling stop. Then, by so doing, deterioration of the hill start performance of the vehicle due to a decrease in the engine rotation speed after cancellation of hill hold control is avoided, the hill hold performance of the vehicle that performs idling stop of the engine 1 is further suitably ensured.

(a) A command to restart the engine is issued.
(b) The engine rotation speed is higher than or equal to the predetermined determination value.
(c) There is a history that the starter 2 is driven in response to the restart command.

Figure 4:
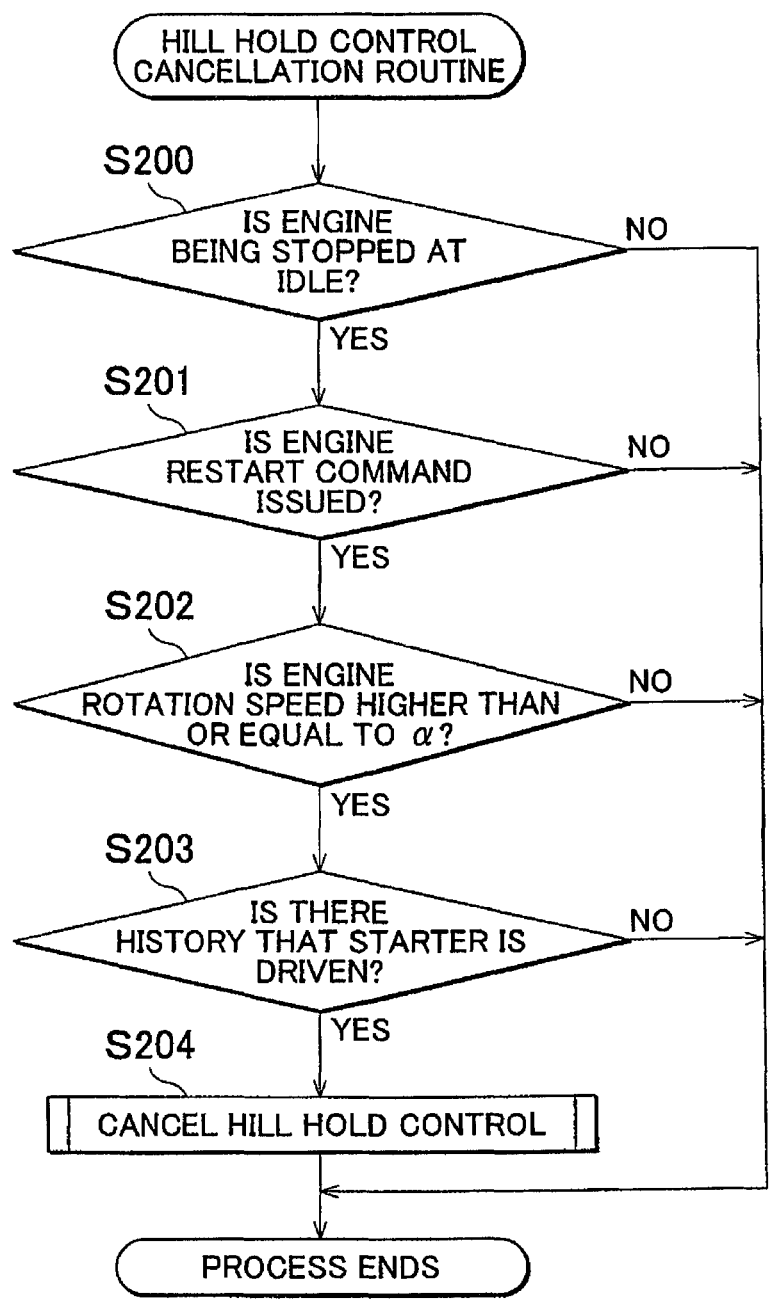
FIG. 4 is a flowchart that shows the procedure of a hill hold control cancellation routine employed in a second embodiment of the invention.
Figure 5:
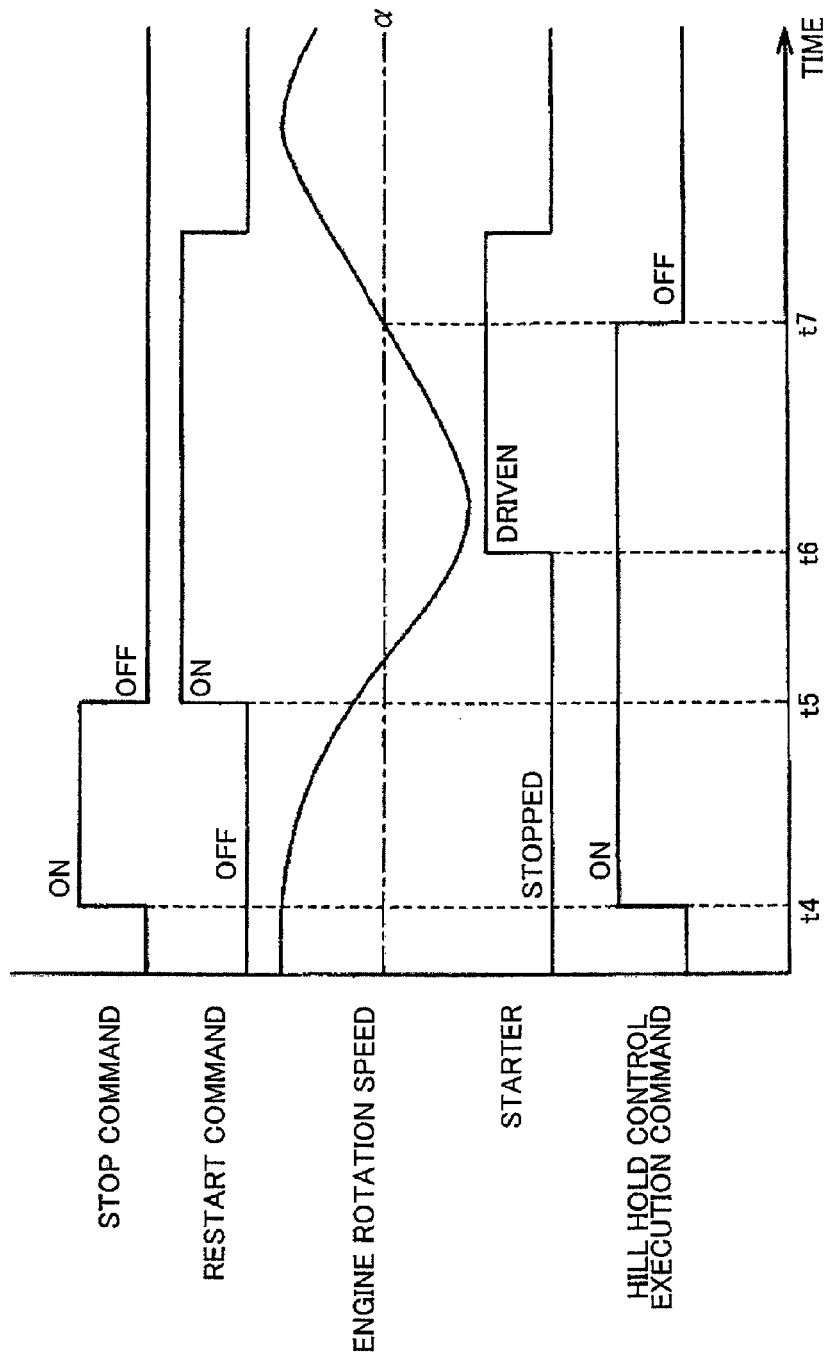
FIG. 5 is a time, chart that shows an example of a control mode according to the second embodiment.

Cancellation of hill hold control in the control device for a vehicle according to the present embodiment is performed through the process of a hill hold control cancellation routine, shown in FIG. 4. The process of the routine is repeatedly executed at predetermined control intervals by the electronic control unit 10 during hill hold control.

When the process of the routine is started, initially, it is determined in step S200 whether the engine 1 is being stopped at an idle. Here, when the engine 1 is not being stopped at an idle (NO in S200), the current process of the routine directly ends. On the other hand, when the engine 1 is being stopped at an idle (YES in S200), the process proceeds to step S201.

When the process proceeds to step S201, it is determined in step S201 whether a command to restart the engine 1 is issued. Here, when a restart command is not issued (NO in S201), the current process of the routine directly ends. On the other hand, when a restart command is, issued (YES in S201), the process proceeds to step S202.

When the process proceeds to step S202, it is determined in step S202 whether the engine rotation speed is higher than or equal to the determination value α. Here, when the engine rotation speed is lower than the determination value α (NO in S202), the current process of the routine ends without cancelling hill hold control. On the other hand, when the engine rotation speed is higher than or equal to the determination value α (YES in S202), the process proceeds to step S203.

When the process proceeds to step S203, it is determined in step S203 whether there is a history that the starter 2 is driven in response to the restart command. Here, when there is no history that the starter 2 is driven (NO in S203), the current process of the routine directly ends. That is, in the routine, even when the engine rotation speed is higher than or equal to the determination value α after issuance of a restart command, when a restart of the engine 2 by the starter 2 is not initiated, cancellation of hill hold control is prohibited. On the other hand, when the engine 1 is not in process of being stopped (NO in S203), a command to cancel hill hold control is issued in step S204, and then the current process of the routine ends.

Next, the operation of the present embodiment will be described with reference to FIG. 5. FIG. 5 shows an example of a control mode of the control device for a vehicle according to the present embodiment when the vehicle is stopped on a hill. In a control example of the drawing, at time t4, a command to stop engine operation through idling stop is issued and, at the same time, a command to execute hill hold control is issued to start hill hold control. After that, at time t5, a restart command to resume engine operation stopped through idling stop is issued.

However, in the control example of the drawing, the restart command is issued before the engine 1 stops in response to the stop command at time t4. In addition, the engine rotation speed at that point in time is higher than or equal to the determination value α. Therefore, in the existing control device for a vehicle, which cancels hill hold control on the condition that the engine rotation speed is higher than or equal to a set value after issuance of a restart command, hill hold control is cancelled at time t5. At this point in time, the engine 1 is in process of being stopped, and the engine 1 is not restarted by the starter 2 until the engine rotation speed decreases to the above described cranking rotation speed or below. Therefore, after issuance of the restart command, the engine rotation speed decreases for a while. When hill hold control is cancelled in such a state, creep torque transmitted to the drive wheels decreases with a decrease in the engine rotation speed. Therefore, sufficient braking force cannot be applied to the wheels 7 when a change operation from the brake pedal 5 to the accelerator pedal 12 is being performed, and the hill start performance of the vehicle deteriorates.

In contrast to this, the control device for a vehicle according to the present embodiment is configured such that, even when the engine rotation speed is higher than or equal to the determination value α after issuance of the restart command, when there is no history that the starter 2 is driven in response to a restart command, cancellation of hill hold control is prohibited. Therefore, in the present embodiment, cancellation of hill hold control is performed not at time t5 but at time t7 at which the engine rotation speed is recovered to the determination value α or above with an increase in the engine rotation speed after the engine 1 is restarted by the starter 2 at time t6. Thus, in the present embodiment, even when a restart command is issued in process of stopping the engine 1 through idling stop, deterioration of the hill start performance of the vehicle due to a decrease in the engine rotation speed after cancellation of hill hold control is avoided.

With the above described control device for a vehicle according to the present embodiment, the following advantageous effects are obtained.

(2) In the present embodiment, the electronic control unit 10 cancels hill hold control on the condition that, after a command to stop engine operation is issued through idling stop, a command to restart the engine is issued, the engine rotation speed is higher than or equal to the predetermined determination value α and there is a history that the starter 2 is driven in response to the restart command. Therefore, deterioration of the hill start performance of the vehicle due to a decrease in the engine rotation speed after cancellation of hill hold control is avoided, the hill hold performance of the vehicle that performs idling stop of the engine 1 is further suitably ensured.

Third Embodiment

Next, a third example embodiment of the control device for a vehicle according to the aspect of the invention will be described in detail with reference to FIG. 6 and FIG. 7.

When the engine rotation speed is sufficiently high even after a command to stop engine operation through idling stop is issued, the engine operation is autonomously recoverable, that is, the engine operation is autonomously resumable without using the starter 2. Therefore, in this case, even when a restart command is issued in process of stopping the engine 1 through idling stop, it is possible to resume engine operation before the engine rotation speed significantly decreases. Then, in the present embodiment, even when a restart command is issued in process of stopping the engine 1 through idling stop, when engine operation is autonomously recoverable, the engine operation is autonomously recovered, and hill hold control is cancelled at that point in time.

Figure 6:
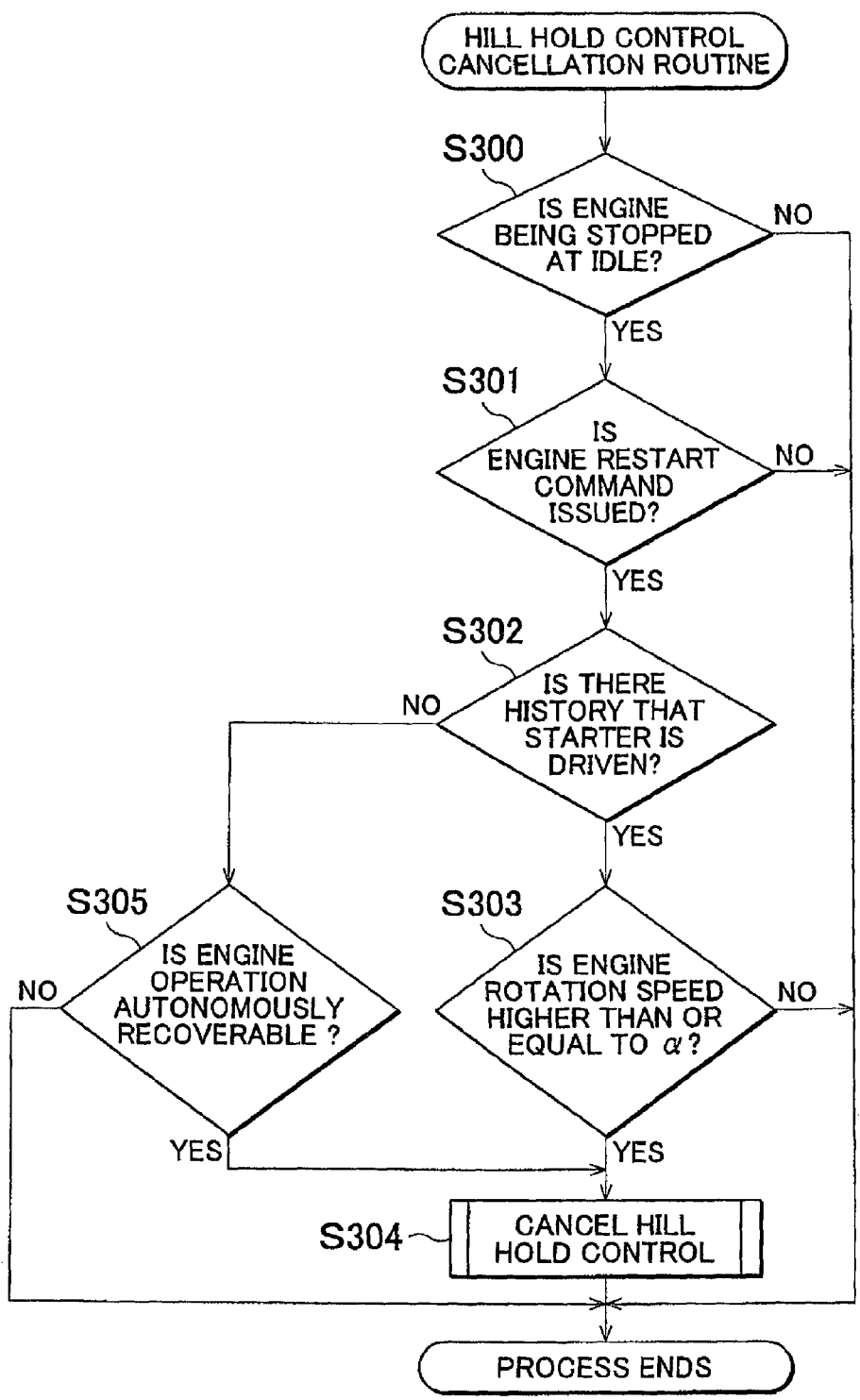
FIG. 6 is a flowchart that shows the procedure of a hill hold control cancellation routine employed in a third embodiment of the invention.

Cancellation of hill hold control in the control device for a vehicle according to the present embodiment is performed through the process of a hill hold control cancellation routine shown in FIG. 6. The process of the routine is repeatedly executed at predetermined control intervals by the electronic control unit 10 during hill hold control.

When the process of the routine is started, initially, it is determined in step S300 whether the engine 1 is being stopped at an idle. Here, when the engine 1 is not being stopped at an idle (NO in S300), the current process of the routine directly ends. On the other hand, when the engine 1 is being stopped at an idle (YES in S300), the process proceeds to step S301.

When the process proceeds to step S301, it is determined in step S301 whether a command to restart the engine 1 is issued. Here, when a restart command is not issued (NO in S301), the current process of the routine directly ends. On the other hand, when a restart command is issued (YES in S301), the process proceeds to step S302.

When the process proceeds to step S302, it is determined in step S302 whether there is a history that the starter 2 is driven in response to the restart command. Here, when there is a history that the starter 2 is driven (YES in S302), the process proceeds to step S303. Then, hill hold control is cancelled (S304) on the condition that the engine rotation speed is higher than or equal to the determination value α (YES in S303).

On the other hand, when there is no history that the starter 2 is driven (NO in S302), the process proceeds to step S305.

Then, it is determined in step S305 whether engine operation is autonomously recoverable. When the engine operation is autonomously recoverable (YES in S305), hill hold control is cancelled (S304). Note that determination as to whether the engine operation is autonomously recoverable here is made on the basis of whether the engine rotation speed is higher than or equal to a predetermined determination value $\beta$. The determination value $\beta$ used in determination here is set to a minimum engine rotation speed at which it is possible to resume engine operation only by resuming fuel supply and ignition without using the starter 2. The determination value $\beta$ is higher than the determination value $\alpha$.

Next, the operation of the present, embodiment will be described with reference to FIG. 7. FIG. 7 shows an example of a control mode of the control device for a vehicle according to the present embodiment when the vehicle is stopped on a hill. In a control example of the drawing, at time t8, a command to stop engine operation through idling stop is issued and, at the same time, a command to execute hill hold control is issued to start hill hold control. After that, at time t9, a restart command to resume engine operation stopped through idling stop is issued.

At time t9, the engine rotation speed is higher than or equal to the determination value $\alpha$, and is a value at which it is possible to obtain creep torque ensures the hill start performance of the vehicle at this point in time. However, the engine 1 at this time is in process of being stopped through idling stop, and, when a restart of the engine 1 by the starter 2 is suspended, the engine rotation speed decreases during then, and creep torque transmitted to the drive wheels decreases. Therefore, when a resume of engine operation is suspended until a restart with the use of the starter 2 is allowed, if hill hold control is cancelled at this point in time, the hill start performance deteriorates.

On the other hand, the engine rotation speed at time t9 is higher than or equal to the determination value $\beta$, and engine operation is autonomously recoverable. Then, the control device for a vehicle according to the present embodiment is configured such that fuel supply and ignition are resumed at this point in time without suspending a restart of the engine 1 by the starter 2 to allow engine operation to be autonomously recovered. Then, at the same time, hill hold control is cancelled. Therefore, after cancelling hill hold control, engine operation is resumed before the engine rotation speed significantly decreases, so the hill start performance of the vehicle due to a decrease in the engine rotation speed after cancellation of hill hold control does not deteriorate.

With the thus configured control device for a vehicle according to the present embodiment, in addition to the advantageous effect described in the above (2), the following advantageous effect is further obtained.

(3) In the present embodiment, even when there is no history that the starter 2 is driven in response to a restart command and the engine 1 is in process of being stopped through idling stop, when engine operation is autonomously recoverable, the engine operation is autonomously recovered, and hill hold control is cancelled. In such a case, even when hill hold control is cancelled in process of stopping the engine, the hill start performance of the vehicle due to a decrease in the engine rotation speed resulting from the cancellation of hill hold control does not deteriorate. In addition, when engine operation is autonomously recoverable at the time of issuance of a restart command, it is possible to cancel hill hold control without a restart of the engine 1 by the starter 2 and an increase in the engine rotation speed after the restart. Therefore, it is possible to further quickly start the vehicle.

Fourth Embodiment

Next, a fourth example embodiment of the control device for a vehicle according to the aspect of the invention will be described in detail with reference to FIG. 8.

In the above embodiments, when the engine 1 is in process of being stopped through idling stop, even when the engine rotation speed at that point in time is sufficiently high and the engine 1 is able to generate creep torque that ensures the hill start performance of the vehicle, cancellation of hill hold control is prohibited. Then, by so doing, deterioration of the hill start performance of the vehicle due to a decrease in the engine rotation speed after cancellation of hill hold control is avoided.

In contrast to this, in the present embodiment, a condition for cancelling hill hold control is varied between when the engine 1 is in process of being stopped through idling stop and when the engine is not in process of being stopped through idling stop. Then, by so doing, cancellation of hill hold control is harder when the engine 1 is in process of being stopped through idling stop than when the engine 1 is not in process of being stopped through idling stop. Specifically, in the present embodiment, hill hold control is cancelled on the condition that the engine rotation speed is higher than or equal to a predetermined determination value, and the predetermined determination value is set so as to be higher when the engine 1 is in process of being stopped through idling stop than when the engine 1 is not in process of being stopped through idling stop.

Cancellation of hill hold control in the control device for a vehicle according to the present embodiment is performed through the process of a hill hold control cancellation routine shown in FIG. 8. The process of the routine is repeatedly executed at predetermined control intervals by the electronic control unit 10 during hill hold control.

When the process of the routine is started, initially, it is determined in step S400 whether the engine 1 is being stopped at an idle. Here, when the engine 1 is not being stopped at an idle (NO in S400), the current process of the routine directly ends. On the other hand, when the engine 1 is being stopped at an idle (YES in S400), the process proceeds to step S401.

When the process proceeds to step S401, it is determined in step S401 whether a command to restart the engine 1 is issued. Here, when a restart command is not issued (NO in S401), the current process of the routine directly ends. On the other hand, when a restart command is issued (YES in S401), the process proceeds to step S402.

When the process proceeds to step S402, it is determined in step S402 whether the engine 1 is in process of being stopped through idling stop. Here, when the engine 1 is not in process of being stopped (NO, in S402), the process proceeds to step S403. Then, hill hold control is cancelled (S404) on the condition that the engine rotation speed is higher than or equal to the determination value $\alpha$ (YES in S403). Note that it is possible to make a determination as to whether the engine 1 is in process of being stopped through idling stop on the basis of whether there is a history that the starter 2 is driven in response to a restart command, whether the engine rotation speed is increasing, or the like.

On the other hand, when the engine 1 is in process of being stopped through idling stop (YES in S402), the process proceeds to step S405. Then, in step S405, it is determined whether the engine rotation speed is higher than or equal to a predetermined determination value $\gamma$. When the engine rotation speed is higher than or equal to the determination value $\gamma$ (YES in S405), hill hold control is cancelled (S404). Note that the determination value γ used in determination in step S405 is set to a value larger than the determination value α used in determination in step S403. That is, in the routine, cancellation of hill hold control is harder when the engine 1 is in process of being stopped through idling stop than when the engine 1 is not in process of being stopped through idling stop.

According to the above described present embodiment, the following advantageous effect is obtained.

(4) In the present embodiment, a condition for cancelling hill hold control is varied between when the engine 1 is in process of being stopped through idling stop and when the engine 1 is not in process of being stopped through idling stop. Then, cancellation of hill hold control is harder when the engine 1 is in process of being stopped through idling stop than when the engine 1 is not in process of being stopped. Therefore, deterioration of the hill start performance of the vehicle due to a decrease in the engine rotation speed after cancellation of hill hold control in process of stopping the engine 1 is suppressed. Thus, according to the present embodiment, it is possible to further suitably ensure the hill hold performance of the vehicle that performs idling stop of the engine 1.

Note that the above described embodiments may be modified into the following alternative embodiments.

In the first embodiment, cancellation of hill hold control is prohibited when the engine 1 is in process of being stopped through idling stop; instead, even when the engine 1 is in process of being stopped through idling stop, when engine operation is autonomously recoverable, the engine operation may be autonomously recovered, and hill hold control may be cancelled.

In the second and third embodiments, it is determined whether the engine 1 is in process of being stopped through idling stop on the basis of the fact that there is a history that the starter 2 is driven in response to a restart command; instead, the determination may be made on the basis of the fact that the engine rotation speed is increasing (the engine rotation speed is not decreasing).

In the above embodiments, it is determined whether the engine 1 is in process of being stopped through idling stop on the basis of the fact that there is no history that the starter 2 is driven in response to a restart command or the fact that the engine rotation speed is not increasing (the engine rotation speed is decreasing); instead, the determination may be made on the basis of a fact other than them.

In the fourth embodiment, the minimum engine rotation speeds (determination values α and γ) that are the conditions for cancelling hill hold control are varied on the basis of the two situations, that is, when the engine 1 is in process of being stopped through idling stop and when the engine 1 is not in process of being stopped through idling stop. Of course, in process of stopping the engine 1 through idling stop, when the condition for cancelling hill hold control is varied between both situations such that cancellation of hill hold control is harder, it is possible to suppress deterioration of the hill start performance of the vehicle due to a decrease in the engine rotation speed after cancellation of hill hold control. Therefore, other than varying the minimum engine rotation speeds (determination values α and γ), by varying the condition for cancelling hill hold control between the two situations as well, it is possible to further suitably ensure the hill start performance of the vehicle that performs idling stop of the engine 1.

In the above embodiments, a restart of the engine 1 for recovery from idling stop is performed with the use of the starter 2; instead, in the case of a hybrid vehicle that includes a driving motor, the driving motor may be used as a starter to restart the engine 1. In such a hybrid vehicle as well, when the engine 1 cannot be restarted immediately after issuance of a restart command for recovery from idling stop, if hill hold control is cancelled in such a situation, the hill start performance of the vehicle may deteriorate due to a delay of a restart of the engine 1 from the command. Therefore, in such a hybrid vehicle as well, by applying the control device according to the aspect of the invention, it is possible to avoid or suppress deterioration of the hill start performance of the vehicle due to cancellation of hill hold control when the engine 1 is in process of being stopped through idling stop.

In the above embodiments, a restart of the engine 1 for recovery from idling stop is performed with the use of the starter 2; instead, when the restart is performed without using the starter 2 as well, it may be impossible to restart the engine 1 immediately after issuance of a restart command. Therefore, when a restart of the engine 1 for recovery from idling stop is performed without using the starter 2 as well, cancellation of hill hold control is prohibited when the engine 1 is in process of being stopped through idling stop. By so doing, it is possible to avoid deterioration of the hill start performance of the vehicle. In addition, in such a case as well, by varying the condition for cancelling hill hold control between when the engine 1 is in process of being stopped through idling stop and when the engine 1 is not in process of being stopped through idling stop, it is possible to avoid or suppress deterioration of the hill start performance of the vehicle due to cancellation of hill hold control in process of stopping the engine.

In the above embodiments, when the brake pedal 5 is not depressed as well, brake hydraulic pressure supplied to the brake 8 of each wheel 7 is held at or above a set value to apply braking force to each of the wheels 7 to thereby execute hill hold control; however, hill hold control may be executed by another method. For example, hill hold control may be executed by locking rotating elements, such as gears and shafts, of the automatic transmission 4 with the use of a clutch, or the like, to suppress rotation of the drive wheels. In addition, in a vehicle that includes an electric parking brake, the parking brake is activated to make it possible to execute hill hold control.

In the above embodiments, the control device according to the aspect of the invention is applied to the vehicle that employs the torque converter 3. Of course, in a vehicle that does not employ a torque converter as well, when hill hold control is executed in response to idling stop of the engine, a restart of the engine may not be immediately started when the engine is in process of being stopped through idling stop. Then, when hill hold control is cancelled in such a state, even when a change operation from the brake pedal to the accelerator pedal is quickly performed, generation of the propelling force of the vehicle delays due to a delay from issuance of a restart command to initiation of the restart. Therefore, the hill start of the vehicle cannot be smoothly performed. Thus, in the case of a vehicle that does not employ a torque converter, such as a manual transmission vehicle and part of continuously variable transmission vehicles as well, by applying the control device according to the aspect of the invention, it is possible to suitably ensure the hill start performance of the vehicle.

What is claimed is:

1. A control device for a vehicle, which executes hill hold control for applying braking force to a wheel independent of driver's brake operation in response to idling stop of an engine, the control device comprising:

an electronic control unit configured to:
cancel the hill hold control when a command to restart the engine is issued for recovery from the idling stop and an engine rotation speed is higher than or equal to a predetermined determination value, and
prohibit cancellation of the hill hold control based on an issuance of a command to restart the engine when the engine is in a process of being stopped through the idling stop and the engine rotation speed is decreasing, in response to an issuance of a command to stop engine operation through the idling stop.

2. The control device according to claim 1, wherein the electronic control unit is configured to: (i) autonomously recover engine operation and, (ii) cancel the hill hold control when the engine is in the process of being stopped through the idling stop and the engine operation is autonomously recoverable.

3. The control device according to claim 1, wherein the electronic control unit is configured to determine whether the engine is in the process of being stopped through the idling stop based on a fact that: (i) there is no history that a starter is driven in response to the restart command, (ii) the engine rotation speed is not increasing or (iii) the engine rotation speed is decreasing.

4. A control device for a vehicle, which executes hill hold control for applying braking force to a wheel independent of driver's brake operation in response to idling stop of an engine, the control device comprising:
an electronic control unit configured to:
cancel the hill hold control on the condition that a command to restart the engine is issued after issuance of a command to stop engine operation through the idling stop, an engine rotation speed is higher than or equal to a predetermined determination value and the engine is in process of being stopped where the engine rotation speed is increasing, and
prohibit cancellation of the hill hold control based on an issuance of a command to restart the engine when the engine is in a process of being stopped through the idling stop and the engine rotation speed is decreasing, in response to an issuance of a command to stop engine operation through the idling stop.

5. The control device according to claim 4, wherein the electronic control unit is configured to: (i) autonomously recover the engine operation, and (ii) cancel the hill hold control when the engine rotation speed is not increasing and the engine operation is autonomously recoverable.

6. A control device for a vehicle, which executes hill hold control for applying braking force to a wheel independent of driver's brake operation in response to idling stop of an engine, the control device comprising:
an electronic control unit configured to:
cancel the hill hold control on the condition that: (i) a command to restart the engine is issued after issuance of a command to stop engine operation through the idling stop, (ii) an engine rotation speed is higher than or equal to a predetermined determination value, and (iii) there is a history that a starter is driven in response to the restart command, and
prohibit cancellation of the hill hold control based on an issuance of a command to restart the engine when the engine is in a process of being stopped through the idling stop and the engine rotation speed is decreasing, in response to an issuance of a command to stop engine operation on the condition that: (i) the engine rotation speed is higher than or equal to the determination value after issuance of the restart command, and (ii) there is no history that the starter is driven prior to the issuance of the restart command.

7. The control device according to claim 6, wherein the electronic control unit is configured to: (i) autonomously recover the engine operation, and (ii) cancel the hill hold control when the engine operation is autonomously recoverable and there is no history that the starter is driven.

8. A control method for a vehicle, the control method comprising:
executing hill hold control for applying braking force to a wheel independent of a driver's brake operation in response to an idling stop of an engine;
cancelling the hill hold control when: (i) a command to restart the engine is issued for recovery from the idling stop, and (ii) an engine rotation speed is higher than or equal to a predetermined determination value, and
prohibiting cancellation of the hill hold control based on an issuance of a command to restart the engine when the engine is in a process of being stopped through the idling stop and the engine rotation speed is decreasing, in response to an issuance of a command to stop engine operation through the idling stop.

9. The control method according to claim 8, further comprising:
autonomously recovering engine operation, and
cancelling the hill hold control when the engine is in process of being stopped through the idling stop and the engine operation is autonomously recoverable.

10. The control method according to claim 8, further comprising:
determining whether the engine is in the process of being stopped through the idling stop based on a fact that: (i) there is no history that a starter is driven in response to a restart command, (ii) the engine rotation speed is not increasing, or (iii) the engine rotation speed is decreasing.

11. A control method for a vehicle, the control method comprising:
executing hill hold control for applying braking force to a wheel independent of a driver's brake operation in response to an idling stop of an engine;
cancelling the hill hold control on a condition that: (i) a command to restart the engine is issued after issuance of a command to stop engine operation through the idling stop, an engine rotation speed is higher than or equal to a predetermined determination value, and (ii) the engine is in process of being stopped where the engine rotation speed is increasing; and
prohibiting cancellation of the hill hold control based on an issuance of a command to restart the engine when the engine is in a process of being stopped through the idling stop and the engine rotation speed is decreasing, in response to an issuance of a command to stop engine operation through the idling stop.

12. The control method according to claim 11, further comprising:
autonomously recovering the engine operation, and
cancelling the hill hold control when the engine rotation speed is not increasing and the engine operation is autonomously recoverable.

13. A control method for a vehicle, the control method comprising:
executing hill hold control for applying braking force to a wheel independent of a driver's brake operation in response to an idling stop of an engine;

cancelling the hill hold control on a condition that: (i) a command to restart the engine is issued after issuance of a command to stop engine operation through the idling stop, an engine rotation speed is higher than or equal to a predetermined determination value, and (ii) there is a history that a starter is driven in response to the restart command; and prohibiting cancellation of the hill hold control based on an issuance of a command to restart the engine when the engine is in a process of being stopped through the idling stop and the engine rotation speed is decreasing, in response to an issuance of a command to stop engine operation on a condition that: (i) the engine rotation speed is higher than or equal to the determination value after issuance of the restart command, and (ii) there is no history that the starter is driven prior to the issuance of the restart command.

14. The control method according to claim 13, further comprising:

autonomously recovering the engine operation, and cancelling the hill hold control when the engine operation is autonomously recoverable and there is no history that the starter is driven.

* * * * *